Feb. 21, 1956  F. MARTINDELL  2,735,525
CLUTCH
Filed Feb. 3, 1951  2 Sheets-Sheet 1

INVENTOR
FRANK MARTINDELL
BY *Emery Robinson*
ATTORNEY

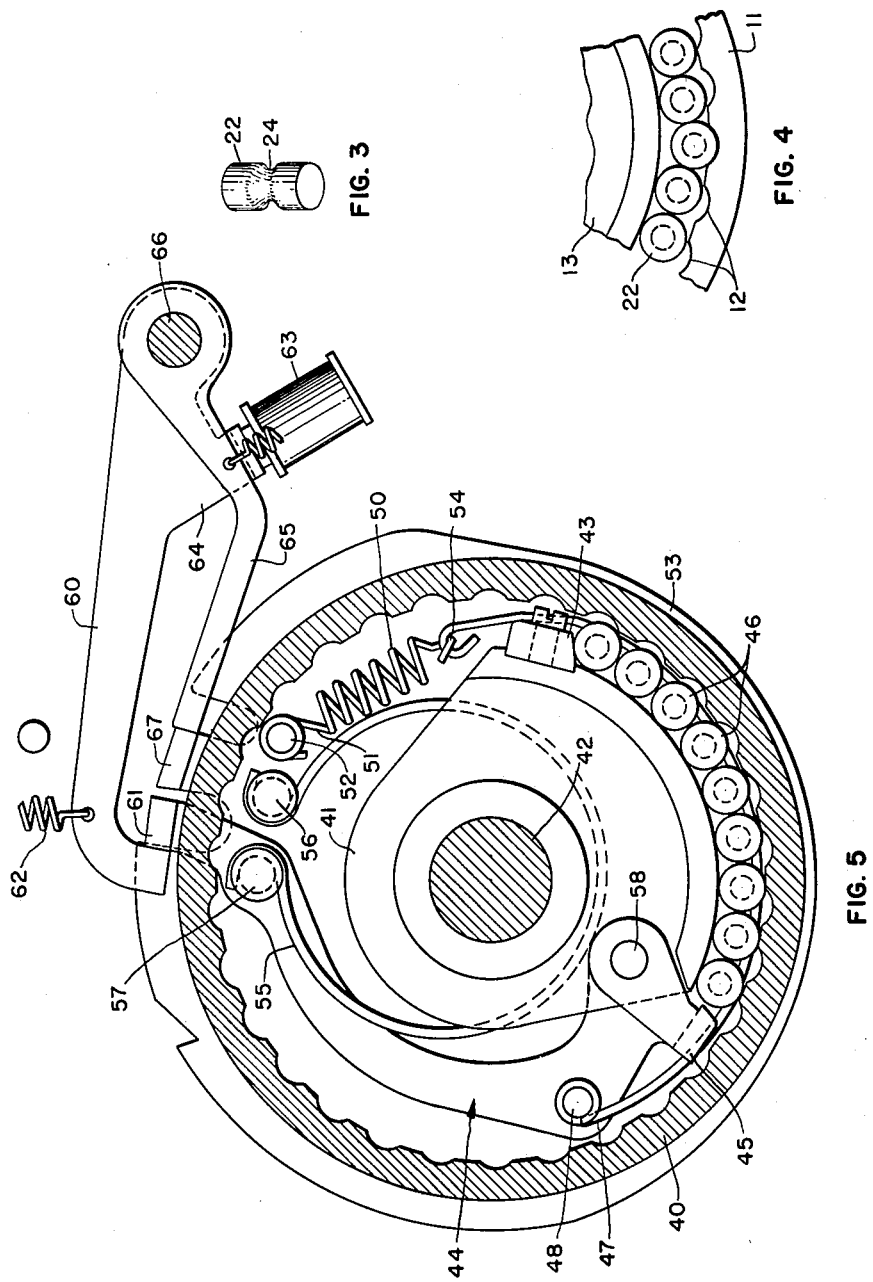

United States Patent Office 2,735,525
Patented Feb. 21, 1956

2,735,525

CLUTCH

Frank Martindell, Western Springs, Ill., assignor to Teletype Corporation, Chicago, Ill., a corporation of Delaware Application February 3, 1951, Serial No. 209,299

22 Claims. (Cl. 192—27)

This invention relates to clutches and more particularly to a positive engaging clutch of the roller type for use in start-stop telegraph apparatus.

In clutches used in start-stop telegraph apparatus it is of paramount importance that the clutch elements engage instantaneously and further that engagement of the clutch elements be maintained without slippage. In order that the various apparatus employed in a telegraph system operate satisfactorily, synchronism must be maintained between the rotating or distributing members of the transmitters and receivers in the system. Initiation of the first signal impulse by the transmitting apparatus must of necessity instantaneously set in operation the transmitter and thereafter reception of the first signal impulse by the receiver must instantaneously set the receiving apparatus in operation and further the transmitter and receiving apparatus must be maintained in operation without slippage between the clutch members during the transmission and reception of a sequence of signal impulses.

The present invention though described in relation to an application in telegraph apparatus is not to be construed as limited to such an application as such a clutch can be advantageously utilized in various other types of apparatus wherein it is desired to obtain an instantaneous clutching action without subsequent slip of the clutch members during engagement.

It is therefore one of the primary objects of this invention to provide a clutch wherein a positive engagement is secured between the clutch elements.

It is a further object of this invention to provide a clutch wherein the clutching action takes place instantaneously upon release of the clutch.

Still another object of the invention is to provide a clutch that is maintained in constant engagement without subsequent slippage between the clutch elements during operation of the clutch.

A still further and more specific object of the invention is to provide a clutch utilizing a plurality of rollers for obtaining operative engagement between the clutch elements.

A further object of this invention is to apply forces to either end of a train of rollers to force one or more of the rollers out of the train into engagement with a driving element of a clutch to procure an operative connection between the clutch elements.

Another object of the invention is to utilize a force multiplying device to secure the force necessary to force one or more of the rollers out of the roller train to obtain the operative driving connection between the clutch elements.

With these and other objects in view the present invention contemplates a driving member in the form of a flanged disc. Positioned within the flanged portion of the disc and spaced from the inner peripheral surface of the said flange is a portion of the driven member. The space between the inner peripheral surface of the flanged driving member and the driven member provides a raceway in which are placed a plurality of abutting rollers. Engaging one end of the rollers is a pin secured to a suitable operating arm and engaging the other end of a train of rollers is a second pin which is secured to the driven member. Resilient means interconnect the operating arm and the driven member to urge the two pins towards each other and hence apply a force to either end of a train of rollers. The inner peripheral surface of the flanged driving means is provided with a plurality of cylindrically shaped notches adapted to receive one or more of the rollers.

In the unoperated position of the clutch, the operating arm and driven member are maintained in a position whereby the pins secured thereto are sufficiently spaced to allow a halter spring surrounding the train of rollers to withdraw the rollers from the notches in the driving member. In the operating position the driven member and operating arm are released so that the pins secured to said members are allowed to move towards each other to force the rollers together to urge one or more of the rollers outwardly into one or more of the cylindrically shaped recesses in the driving member. It may be thus appreciated that the train of power may be readily traced from the driving member, through one or more of the rollers positioned within the cylindrically shaped notches, through the abutting rollers, through the pin secured to the driven member and finally to the driven member itself.

Other objects and advantages of the present invention will be apparent from the following detailed description when considered with the accompanying drawings, wherein, Fig. 1 discloses a front elevational view partially in section of a roller clutch embodying the principal features of the invention;

Fig. 3 is a perspective view of one of the rollers;

Fig. 4 is a side elevational view of a portion of the roller train showing one of the rollers moved into one of the cylindrically shaped recesses in the driving member; and Fig. 5 is a side elevational view of a modified form of the clutch embodying the principle of the invention.

Figure 1:
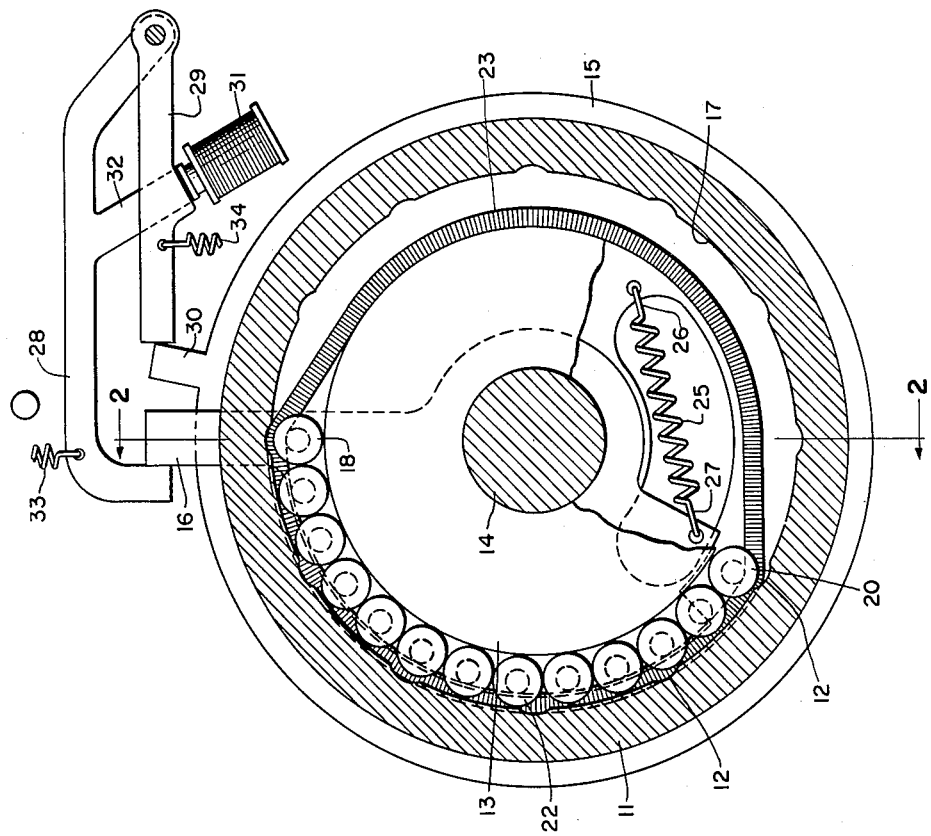
Figure 2:
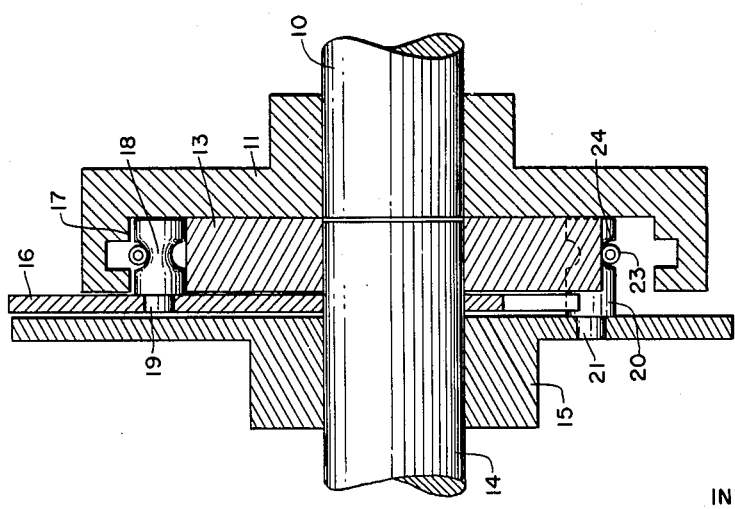
Fig. 2 is a sectional view taken along lines 2—2 of Fig. 1 looking in the direction of the arrows.

Referring to the drawings and more particularly to Figs. 1 and 2, there is disclosed a driving shaft 10 continually rotated by any suitable source of rotative power. Rigidly secured to the driving shaft 10 is flanged driving member 11 having formed on its inner peripheral surface 17 a plurality of spaced cylindrically shaped recesses 12. Positioned within the flanged portion of the driving member 11 is a back up disc or support 13 rotatably mounted about a driven shaft 14. The driven shaft 14 has secured thereto a disc shaped driven member 15 and in addition an operating arm 16, interposed between the disc 13 and the driven member 15, is rotatably mounted about the shaft 14. The disc 13 is sufficiently spaced from the inner peripheral surface 17 of the driving member 11 to provide a raceway in which is positioned an operating pin 18 rotatably mounted on a stud 19 secured to the operating arm 16. A driven pin 20 rotatably mounted about a stud 21 secured to the driven disc shaped member 15 is also positioned within the raceway. A plurality of rollers 22, one of which is illustrated in Fig. 3, are also positioned within the raceway to abut each other to form an arcuate train of rollers located between the operating pin 18 and the driven pin 20. A halter spring 23 extends around the periphery surface of the disc 13 and within the semicircular grooves 24 formed in the rollers 22 to normally hold said rollers against the surface of the disc.

A spring 25 is secured at one end 26 to the driven member 15 and at its other end 27 to the operating arm 16. This spring 25, as shown in Fig. 1, is under tension to urge the operating arm 16 and driven member 15 to rotate relative to each other about the driven shaft 14. However, relative rotative movement of the operating arm 16 and driven member 15 is prevented by a latch up arm 28 which engages the operating arm 16 and by a detent 29 which engages a projection 30 integrally on the driven member 15. Under these conditions, the driven pin 20 and the operating pin 18 are maintained sufficiently spaced apart to enable the halter spring 23 to retain all the rollers 22 against the periphery surface of the back up disc 13.

In start-stop telegraph apparatus, a normally energized selector magnet 31 is utilized to control the operation of the sending and receiving apparatus. An armature 32 is shown as an integral extension of the latch up arm 28. A tension spring 33 is shown as connected to the latch up arm 28 and normally urges the latch up arm out of engagement with the operating arm 16 but the normally selector magnet 31 overcomes the effect of this spring to maintain the latch up arm 28 in engagement with the operating arm 16.

The spring 25 tends to rotate the operating arm 16 in a counterclockwise direction, as viewed in Fig. 1, and consequently the driven member 15 in a clockwise direction. Counterclockwise movement of the operating arm 16 is prevented by the latch up arm 28 and clockwise movement of the driven member 15 is prevented by the detent 29 engaging the projection 30 of the driven member 15. A tension spring 34 secured to the detent 29 normally urges the detent into engagement with the projection 30 to prevent the clockwise movement of the driven member.

In operation of this embodiment of the clutch an initiating signal which is a de-energizing impulse is received by the selector magnet 31 to release the latch up arm 28 from the operating arm 16. This results in allowing the spring 25 to move the operating arm in a counterclockwise direction. Movement of the operating arm 16, moves the operating pin along the raceway towards the driven pin 20 and hence exerts a force against the rollers interposed between the two pins 18 and 20. The driven pin 20 acts as a reaction member; that is, when a force is exerted by pin 18, a reaction force is exerted by the pin 20 on the rollers. The rollers 22, which were normally retained by the relatively weak halter spring 23 against the back up disc 13, are now urged to move radially outward by the action of the pins 18 and 20 approaching each other. Inasmuch as the tension spring 25 is stronger than the halter spring 23 one or more of the rollers 22 are urged outwardly from the arcuate train of rollers into one or more of cylindrical recesses in the flanged driving member 11. This condition is illustrated in Fig. 4 wherein, one of the rollers 22 is shown positioned within one of the cylindrically shaped recesses. Upon one or more of the rollers becoming seated within one or more of the recesses, a train of power may be traced from the constantly rotating driving shaft 10, through the flanged driving member 11, through one or more of the rollers 22 positioned within the recesses 12, then through the rollers located between the engaged rollers and the driven pin 20, through the driven pin 20, through the stud 21, through the driven member 15 and finally to the driven shaft 14.

During rotation of the driving member the detent 29 rides along the outer peripheral surface of the driven member 15 and upon the projection 30 arriving at the initial starting position, said projection engages the detent 29 to raise it against the force of the tension spring 34. Therefore, if the driven member is continually rotated, the detent 29 is ineffectual to control the operation of any of the elements in the clutch.

Normal operation of the start-stop telegraph apparatus requires the disengagement of the clutch elements upon completion of one revolution of the clutch. This is attained by energizing the selector magnet 31 just prior to the completion of a revolution of the clutch whereupon the latch up arm 28 is moved by its armature 32 against the force of the spring 33, into position to be engaged by the operating arm 16. Engagement of the latch up arm with the projection 16 positions the operating pin 18 in the initial position. There is sufficient momentum imparted to the driven member 15 to carry said member a short distance subsequent to the engagement of the operating arm 16. The momentum is sufficient to carry the projection 30 past the detent 29 whereupon the spring 34 moves the detent into position to engage the projection 30 upon the momentum of the driven member being overcome by the spring 25. When the spring 25 overcomes the momentum of the driven member 15, the driven member 15 is moved in a counterclockwise direction to bring the projection 30 into engagement with the detent 29 to return the driving pin to the initial position which is sufficiently spaced from the operating pin 18 to allow the halter spring 23 to move the rollers 22 from the recesses 12.

The embodiment heretofore described is a positive engaging clutch. It is to be understood however, that it is not absolutely necessary that the flanged driving member be notched along its inner peripheral surface in order that a driving connection be secured between the clutch elements. The inner peripheral surface of said driving member could be absolutely smooth and the clutch would operate as a frictional clutch; that is, one or more of the rollers 22 would be forced under the influence of the spring 25 into frictional engagement with the inner peripheral surface of the driving member 11 to provide a driving connection with the driven member 15.

Referring to Fig. 5 there is shown a modified form of the invention, in this instance a flanged driving member 40, similar to that disclosed in the embodiment shown in Fig. 1, has positioned within its flanged portion a driven segment 41 secured to a driven shaft 42. The outer peripheral surface of the segment 41 is spaced from the inner peripheral surface of the driving member 40 to provide a raceway. Secured at one end of the peripheral surface of the segment 41 is a notched stop 43. Pivotally secured in the vicinity of the other extremity of the peripheral surface of the segment 41 is an actuator lever 44 having formed thereon a head 45 which is positioned within the raceway. This lever is pivotally mounted between its extremities hence forming a lever of the first class. A plurality of rollers 46 identical with the rollers 22 disclosed in the embodiment shown in Figs. 1 and 2 are positioned within the raceway between the stop member 43 and the head 45 of the lever 44. A flexible wire 47 is secured to a stud 48 mounted on the lever 44 and extends over each of the rollers 46 and through the notch in the stop 43. A spring 50 is secured at one end 51 to a stud 52 extending from a disc shaped driven member 53 and it is secured at its other end 54 to the wire 47. Thus a resilient retaining means engaging the rollers 46 within their circumferential grooves is provided for maintaining the rollers in engagement with the peripheral surface of the driven segment 41. It may be thus noted that the peripheral surface of the segment 41 between the stop 43 and the head 45 provides a support for the rollers in a manner substantially the same as that in which the back up disc or support 13 provided a support for rollers in the embodiment of the invention shown in Fig. 1. A loop spring 55 engages under tension, a stud 56 secured to the driven member 53 and at its other end a stud 57 secured to the lever 44. Thus, the loop spring 55 acts to urge the lever 44 about its pivot point 58 to move the head 45 into engagement with the arcuate train of rollers 46. Movement of the lever 44 is prevented by means of a latch up arm 60 which engages a dog 61 on the lever 44. The latch up arm 60 is urged out of engagement with the dog 61 by means of a tension spring 62 but the effect of the spring 62 is overcome by the effect of an energized selector magnet 63 which holds an extension 64 of the latch up arm 60 in a downward position. A detent 65 pivotally mounted about point 66 engages a dog 67 formed on the driven member 53 to prevent counterclockwise movement of the driven member.

In operation of this clutch the magnet 63 is deenergized to release the latch up lever 60 which disengages the dog 61 to allow the lever 44 to pivot its head 45 into engagement with the train of rollers 46. Movement of the lever 44 about its pivot point 58 is also aided by the tension spring 50 which, as previously pointed out, is connected to a stud 48 mounted on the lever 44. Therefore, the loop spring 55 and the tension spring 50 urge the head 45 into engagement with the arcuate train of rollers to force one or more of the rollers radially outward into one or more of the cylindrical shaped recesses in the flanged driving member 40.

In operation a train of power may be traced from the driving member 40 through the engaged rollers 46, through the stop 43, to the driven segment 41 and hence to the driven shaft 42. Again as previously indicated in the discussion of the embodiment disclosed in Figs. 1 and 2, this clutch could also be operated as a friction clutch. This could easily be accomplished by providing a flanged driving member 40 with a smooth inner peripheral surface which would be engaged by one or more of the rollers 46 to provide a frictional connection between the driving and driven elements of the clutch.

In order to disengage this clutch the selector magnet 63 is energized to bring the latch up arm 60 into the path of the dog 61. The dog 61 strikes the latch up arm 60 to pivot the lever 44 about its pivot point to move the head 45 out of engagement with the train of rollers 46. Upon such engagement of the latch up lever 60 with the dog 61 the momentum imparted to the driven members is sufficient to carry the dog 67 past the detent 65 so that the detent 65 drops behind the dog 67 to engage said dog when the momentum of the driven members is overcome by the action of the loop spring 55 and tension spring 50. When the head 45 and stop 43 are returned to the initial position they are sufficiently spaced apart so that the tension spring 50 acting upon wire 47 withdraws all the rollers 46 from the cylindrical recesses within the flanged driving member 40.

In the modification shown in Fig. 5 the force supplied to the stud 57 on the long arm of the lever 44 by the loop spring 55 is greatly multiplied by the lever 44 before it is applied by the head 45 to the train of arcuate rollers 46. It is also to be noted that the force applied by the spring 50, through the wire 47, to the stud 48, is also multiplied by the lever 44 inasmuch as the distance between the stud 48 and the pivot point 58 of the lever 44 is greater than the distance of force applied by the head 45 and the pivot point 58 of the lever 44. Utilization of such a force multiplying arrangement of elements insures a more positive engagement of the rollers 46 within the recesses formed on the inner peripheral surface of the driving member 40. The action of this clutch with its force multiplying elements provides for almost instantaneous movement of the rollers 46 into the respective cylindrical recesses within the driving member 40.

It is to be understood the above-described arrangement of apparatus and construction of clutch elements are simply illustrative of the application of the principles of the invention and many other modifications may be made without departing from the spirit and scope of the invention.

What is claimed is:

1. In a roller clutch, a driving member, driven means, a support spaced from said driving member to provide a raceway therebetween, a plurality of abutting rollers positioned within said raceway, a reaction member engaging the last of said rollers, and means movably mounted on the driven means for engaging and forcing said rollers against the reaction member to move one of said rollers transversely of the direction of force application to effectuate a driving connection between the driving member and driven means.

2. In a roller clutch, a driving member, driven means, a support concentrically positioned in relation to said driving member to provide a raceway therebetween, an arcuate train of abutting rollers positioned within the raceway, a reaction member, and means for applying a force along the arc of the centers of the rollers to force the rollers against the reaction member to radially move one of said rollers from the arc of the train of the rollers to effectuate a driving connection between the driving member and the driven means.

3. In a roller clutch, a driving drum, driven means, a support positioned within the driving drum, said support being spaced from the inner peripheral surface of the driving drum to form a raceway, a plurality of rollers positioned within the raceway, a reaction means in the raceway and means movably mounted on the driven means for engaging and forcing the rollers against the reaction means to force one of said rollers into engagement with the inner peripheral surface of the driving drum.

4. In a positive engaging clutch, a driving member having a plurality of notches therein, driven means, a support spaced from said driving member to provide a raceway therebetween, a train of abutting rollers positioned within the raceway, an element connected to the driven member, and means for applying a force to one end of the train of rollers to force the rollers against the element and together to move one of the rollers out of the train into one of the notches in the driving member.

5. In a positive engaging clutch, a driving member having a plurality of recesses therein, a driven means, a support positioned in relation to the driving member to provide a raceway therebetween, an arcuate roller train positioned within the raceway, and means operative on both ends of said arcuate train of rollers for forcing one of the rollers radially of the arc of the arcuate roller train into one of the recesses in the driving member.

6. In a positive engaging clutch, a driving drum having a plurality of cylindrical recesses in its inner peripheral surface, driven means, a support formed to provide a raceway between the driving drum and driven means, a pair of spaced members secured to the driven means and positioned within the raceway, a plurality of rollers positioned within the raceway and between the pair of spaced members, and means to move the pair of members toward each other to force one of the rollers into one of the recesses in the driving drum whereby a driving connection is made between the driving drum and the driven means.

7. In a positive engaging clutch, a driving member having a plurality of notches therein, driven means, a support positioned to form a raceway between the driving member and the driven means, a train of rollers positioned within the raceway, a first means engaging one end of the train of rollers, a second means engaging the other end of the train of rollers, and means for moving the first and second means relative to each other to force one of the rollers out of the train of rollers into one of the notches in the driving member.

8. In a positive engaging clutch, a driving member having a plurality of notches therein, a driven means, a support spaced from said driving member to provide a raceway therebetween, a first member secured to said driven means and positioned within said raceway, a second member secured to said driven means and positioned within said raceway, a plurality of rollers positioned within said raceway and between said first and second members, and means to move the first and second members relative to each other to force one or more of said rollers into said notches in the driving member.

9. In a positive engaging clutch, a driving member having a plurality of notches therein, driven means, a support positioned to form a raceway between the driving member and support, a train of rollers positioned within the raceway, said driven means comprising a rotatable actuator, a pin secured to said actuator and positioned within the raceway to engage one end of the train of rollers, a rotatable member, a second pin secured to said member and positioned within the raceway to engage the other end of said train of rollers, and means to rotate the actuator and member relative to each other to move the pins toward each other to force one of the rollers into one of the notches in the driving member.

10. In a roller clutch, a driving drum having a plurality of cylindrical recesses along its inner peripheral surface, a driven means, a support positioned within the driving drum to form a raceway, a series of cylindrical members positioned within the raceway, the two cylindrical members at the end of the series of cylindrical members being secured to the driven means, and means to urge the two secured cylindrical members toward each other to force one of the other cylindrical members into one of the said recesses in the inner peripheral surface of the driving drum.

11. In a positive engaging clutch, a driving drum having a plurality of recesses formed on its inner peripheral surface, a disc positioned within the drum, a plurality of rollers positioned within the raceway formed between the disc and the inner peripheral surface of the driving drum, a driven member, a cylindrical member secured to the driven member and positioned within the raceway, an actuator member, a cylindrical member secured to said actuator member and positioned within the raceway, said rollers being positioned in the raceway between the cylindrical members, and means for moving the actuator member relative to the driven member to move the two cylindrical members toward each other to force one of the rollers into one of the recesses in the driving drum.

12. In a positive engaging clutch, a driving member having a plurality of recesses therein, driven means spaced from the driving member to provide a raceway therebetween, an abutting series of engaging means positioned within the raceway, force applying means, a reaction means, and means to multiply said force and apply it to one end of said series of engaging means to force said rollers against the reaction means whereby one said engaging means moves into one of the recesses in the driving member.

13. In a roller clutch, a driving drum having a plurality of spaced cylindrically shaped recesses formed on its inner peripheral surface, driven means positioned within said driving drum, said driven means being spaced from the inner peripheral surface of the driving drum to provide a raceway, a stop member secured to said driven means, force applying means, a plurality of abutting rollers positioned within said raceway and between said force applying means and said stop member, and means to multiply and apply said force to said rollers to force them against said stop member whereby one of the rollers is forced into one of said cylindrical recesses in the driving drum.

14. In a roller clutch, a driving drum having a plurality of cylindrical recesses in its inner peripheral surface, a driven member positioned within said driving drum, said driven member having its outer peripheral surface spaced from the inner peripheral surface of the driving drum to provide a raceway, a stop member secured to said driven member, a series of rollers positioned within said raceway, said rollers abutting each other and the last of said rollers abutting the fixed stop, means for multiplying a force and applying it to the roller on the free end of the series of rollers to force said rollers against said stop member to force one of said rollers into one of the recesses in the inner peripheral surface of the driving drum, and means acting upon said force multiplying means for producing an initiating force.

15. In a roller clutch, a driving drum having a plurality of cylindrical recesses formed in its inner peripheral surface, a driven member having a segmental arcuate outer surface, said arcuate surface being spaced from the inner peripheral surface of the driving drum to form a raceway, a fixed stop positioned on one extremity of the arcuate surface of the driven member and within the raceway, a lever pivotally mounted on the driven member and in the vicinity of the other extremity of the arcuate surface, one arm of said lever projecting into said raceway, a plurality of rollers positioned within the raceway and between said lever arm and said fixed stop, and means to apply a force to the free end of the lever to pivot said lever to force said rollers together so that one of the rollers is forced into one of the cylindrical recesses in the inner peripheral surface of the driving drum.

16. In a positive engaging clutch, a driving member having a plurality of recesses formed therein, driven means spaced from the driving member to provide a raceway therebetween, a plurality of engaging members positioned within the raceway, a stop engaging one end of said engaging members, means for mounting the stop on the driven means, force multiplying means engaging the other end of said engaging members to force one of said engaging members into one of said notches in the driving member, means to apply a first force to said force multiplying means, means to apply a second force to said force multiplying means, said second force applying means adapted to urge said engaging members from said notches in the driving member.

17. In a positive engaging clutch, a driving member having a plurality of recesses formed therein, driven means, a support spaced from said driving member to form a raceway therebetween, a plurality of rollers positioned within said raceway, each of said rollers being provided with a circumferential groove, resilient means spanning the rollers and positioned within said grooves to urge said rollers out of said recesses in said driving member, and means for forcing the rollers together to move one of said rollers against the effect of the resilient means into one of said recesses in the driving member.

18. In a roller clutch, a driving drum having formed on its inner peripheral surface a plurality of spaced cylindrical recesses, driven means positioned within said driving drum, said driven means being spaced from said inner peripheral surface to provide a raceway, a first member fixed to said driven means and positioned within said raceway, a second member fixed to said driven means, a plurality of rollers positioned within said raceway and between said members, means for retaining said rollers in engagement with said driven means, and means for moving one of said members toward the other to overcome the effect of the retaining means to force one of said rollers into one of said recesses in the inner peripheral surface of the driving drum.

19. In a clutch, a driving member, driven means, a support spaced from the driving member to provide a raceway therebetween, an arcuate train of engaging elements positioned within the raceway, a reaction member engaging one end of the train of engaging elements, and means for applying a force along an arc described by the centers of the engaging elements to force the elements against the reaction member whereby one or more of the engaging elements are moved from the arcuate train to engage the driving member.

20. In a roller clutch, a driving member, a driven means, a support spaced from the driving member to provide a raceway therebetween, a series of abutting rollers positioned within said raceway, means fixed to the driven means engaging one end of the series of rollers, means movably mounted on the driven means engaging the other end of said series of rollers, and means for applying a force to said movably mounted means to force the rollers together whereby one of the rollers is moved into engagement with the driving member.

21. In a roller clutch, a driving member, driven means, a support spaced from the driving member to provide a raceway therebetween, a plurality of abutting rollers positioned within the raceway, means for maintaining said rollers in the raceway, a reaction member engaging one end of the abutting rollers, and means movably mounted on the driven means for applying force to urge said rollers against the reaction member to move one of said rollers against the effect of the maintaining means and transversely of the direction of force application to effectuate a driving connection between driving member and driven means.

22. In a clutch, a driving drum having a plurality of recesses formed along its inner peripheral surface, a driven member, a support connected to the driven member having a surface thereof concentrically spaced from the inner peripheral surface of the drum to provide a raceway, a plurality of abutting engaging members positioned in an arcuate train within the raceway, a stop element secured to the support for engaging one end of the train of abutting members, a force multiplying means engaging the other end of the train of abutting members, means for preventing the force multiplying means from applying a force to the abutting members, means for holding the engaging members against the support, and means for releasing the preventing means to render effective the force multiplying means to apply a force to the train of engaging members whereby one or more of said engaging members move against the effect of the holding means into one or more of the recesses to effectuate a driving connection between the driving drum and driven member.

References Cited in the file of this patent

UNITED STATES PATENTS

| 1,930,711 | Fishburn | Oct. 17, 1933 |
| 1,980,757 | Janda | Nov. 13, 1934 |

FOREIGN PATENTS

| 312,191 | Germany | Dec. 28, 1917 |
| 337,484 | Germany | June 2, 1921 |